(12) United States Patent
Sugioka (10) Patent No.: US 12,483,290 B2
(45) Date of Patent: Nov. 25, 2025

(54) WIRELESS MODULE

(71) Applicant: TDK Corporation, Tokyo (JP)

(72) Inventor: Teruyasu Sugioka, Tokyo (JP)

(73) Assignee: TDK Corporation, Tokyo (JP)

( * ) Notice: Subject to any disclaimer, the term of this patent is extended or adjusted under 35 U.S.C. 154(b) by 77 days.

(21) Appl. No.: 18/617,049

(22) Filed: Mar. 26, 2024

(65) Prior Publication Data

US 2024/0333332 A1 Oct. 3, 2024

(30) Foreign Application Priority Data

Mar. 28, 2023 (JP) ................... 2023-051592

(51) Int. Cl.
*H04B 1/403* (2015.01)
*H03F 3/195* (2006.01)

(52) U.S. Cl.
CPC ............. *H04B 1/403* (2013.01); *H03F 3/195* (2013.01)

(58) Field of Classification Search
CPC .......... H04B 1/40; H04B 1/403; H04B 1/408; H04B 1/406; H04B 1/405; H03F 3/195
See application file for complete search history.

(56) References Cited

U.S. PATENT DOCUMENTS

| | | | |
|---|---|---|---|
| 6,906,411 B1 | 6/2005 | Katsura et al. | |
| 10,062,670 B2* | 8/2018 | Frenette | H01L 25/0655 |
| 10,297,576 B2* | 5/2019 | Frenette | H01L 25/50 |
| 10,483,250 B2* | 11/2019 | Nair | H01L 24/96 |
| 2012/0195396 A1* | 8/2012 | Feldman | H01L 24/82 |
| | | | 438/109 |
| 2018/0261566 A1* | 9/2018 | Babcock | H01L 25/16 |
| 2021/0320081 A1* | 10/2021 | Babcock | H01L 25/16 |
| 2023/0084538 A1* | 3/2023 | Mu | H01Q 9/04 |
| | | | 343/702 |

FOREIGN PATENT DOCUMENTS

| | | |
|---|---|---|
| CN | 101452918 B | 6/2010 |
| JP | 2013-081017 A | 5/2013 |

\* cited by examiner

*Primary Examiner* — Khanh C Tran
(74) *Attorney, Agent, or Firm* — Rimon P.C.

(57) ABSTRACT

Disclosed herein is a wireless module that includes an oscillation circuit component and an RFIC mounted on a multilayer substrate. The oscillation circuit component includes a clock terminal and a first ground terminal. The RFIC has a second ground terminal that supplies a ground potential to a clock circuit therein and a third ground terminal that supplies a ground potential to an RF circuit therein. The multilayer substrate includes a first conductor layer positioned closest to the plurality of pad electrodes of the RFIC and including a first ground pattern connected to the first and second ground terminals and a second ground pattern connected to the third ground terminal. The first and second ground patterns form a gap between the second and third ground terminals in a plan view as viewed in a stacking direction of the multilayer substrate.

7 Claims, 8 Drawing Sheets

WIRELESS MODULE

CROSS-REFERENCE TO RELATED APPLICATION

This application claims the benefit of Japanese Patent Application No. 2023-051592, filed on Mar. 28, 2023, the entire disclosure of which is incorporated by reference herein.

BACKGROUND OF THE ART

Field of the Art

The present disclosure relates to a wireless module and, more particularly to a wireless module having an oscillation circuit component and an RFIC.

Description of Related Art

JP 2013-081017A discloses a wireless module having a structure in which an oscillation circuit component and an RFIC are mounted on a multilayer substrate.

In the wireless module described in JP 2013-018017A, a ground terminal of the oscillation circuit component and a ground terminal of the RFIC are short-circuited by a ground pattern immediately therebelow. Therefore, harmonic noise caused by the oscillation circuit component flows into the RFIC through the ground pattern, which may result in degradation in communication sensitivity.

SUMMARY

The present disclosure describes a technology for preventing degradation in communication sensitivity caused due to harmonic noise in a wireless module having a structure in which an oscillation circuit component and an RFIC are mounted on a multilayer substrate.

A wireless module according to one aspect of the present disclosure includes a multilayer substrate, an oscillation circuit component, and an RFIC, the oscillation circuit component and RFIC being mounted on the multilayer substrate. The multilayer substrate includes a first conductor layer positioned closest to a plurality of pad electrodes provided to the RFIC. The oscillation circuit component includes a clock terminal that outputs a clock signal and a first ground terminal that is supplied with a ground potential. The RFIC includes a clock circuit that is supplied with the clock signal and an RF circuit that transmits/receives an RF signal. The plurality of pad electrodes includes a second ground terminal that supplies a ground potential to the clock circuit and a third ground terminal that supplies a ground potential to the RF circuit. The first conductor layer includes a first ground pattern that is connected to the first and second ground terminals and a second ground pattern that is connected to the third ground terminal. The first and second ground patterns form a gap between the second and third ground terminals in a plan view as viewed in a stacking direction of the multilayer substrate.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Some embodiments of the present disclosure will be explained below in detail with reference to the accompanying drawings.

Figure 1:
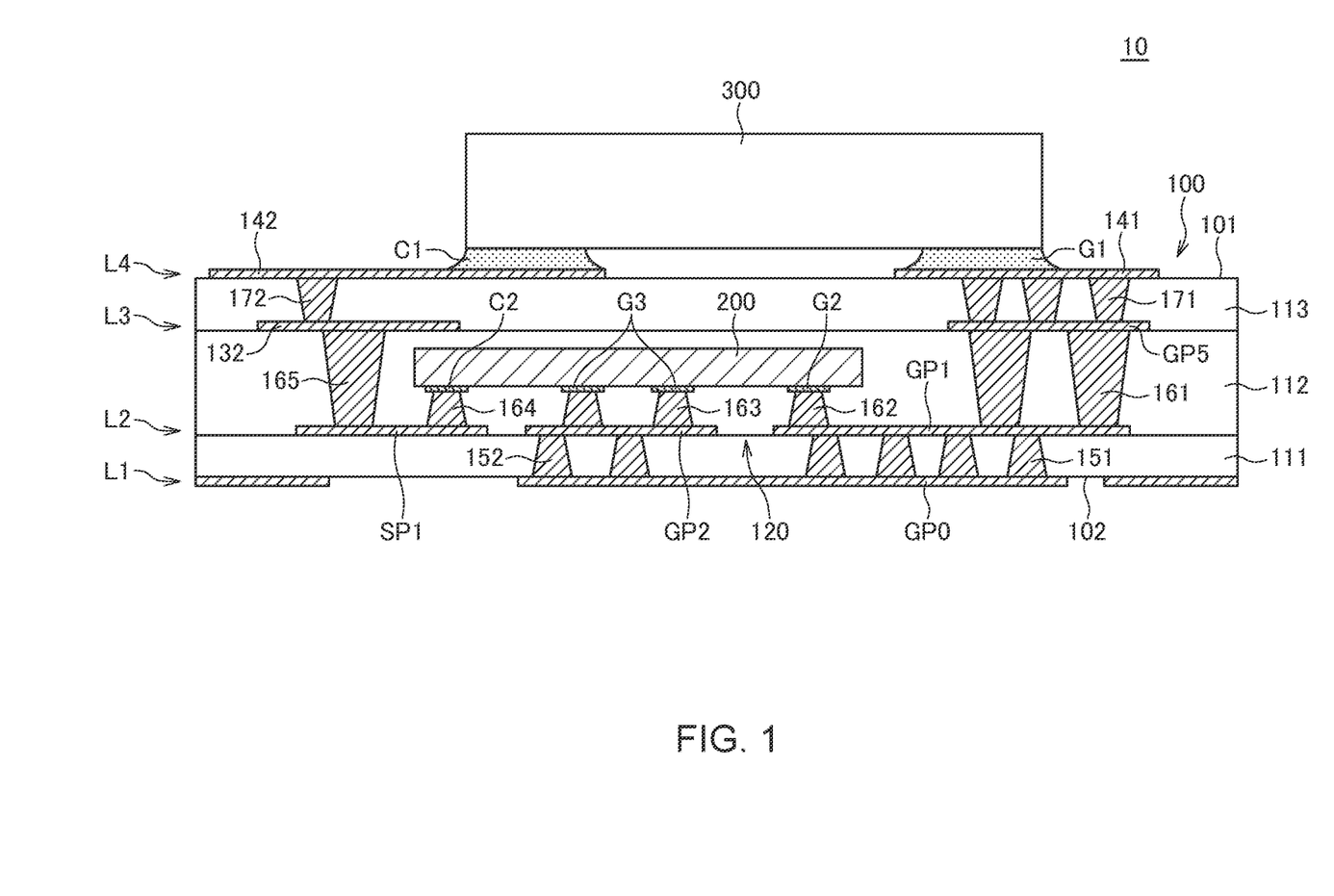
FIG. 1 is a schematic cross-sectional view for explaining the structure of a wireless module 10 according to a first embodiment of the present disclosure.

FIG. 1 is a schematic cross-sectional view for explaining the structure of a wireless module 10 according to a first embodiment of the technology described herein.

As illustrated in FIG. 1, the wireless module 10 according to the first embodiment has a multilayer substrate 100, an RFIC 200, and an oscillation circuit component 300. The RFIC 200 and oscillation circuit component 300 are mounted on the multilayer substrate 100. The multilayer substrate 100 has a structure in which a plurality of conductor layers L1 to L4 and a plurality of insulating layers 111 to 113 are alternately stacked. The RFIC 200 is embedded in the insulating layer 112, and the oscillation circuit component 300 is mounted on one surface 101.

Figure 2:
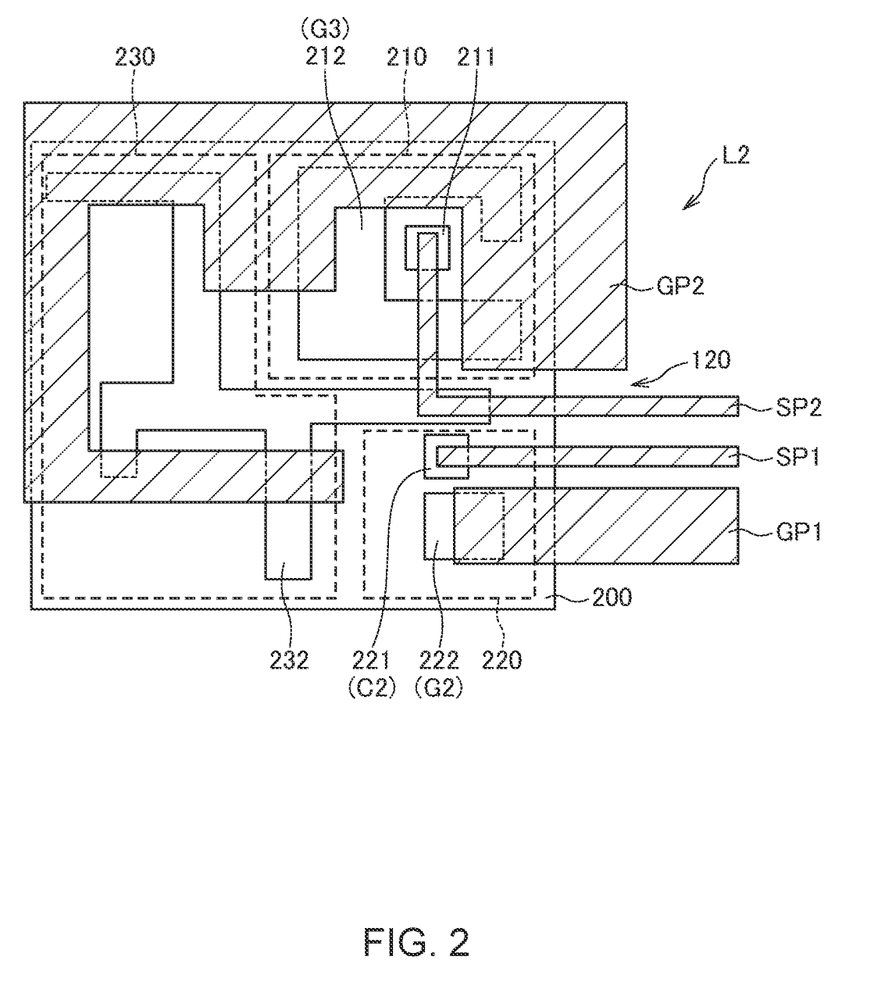
FIG. 2 is a schematic plan view of the RFIC 200.

The RFIC 200 includes an RF circuit 210, a clock circuit 220, and a digital circuit 230 as illustrated in FIG. 2 which is a schematic plan view. The RF circuit 210 is a circuit block that processes an RF signal, and a signal terminal 211 that performs transmission/reception of the RF signal and a ground terminal 212 that supplies a ground potential to the RF circuit 210 are disposed so as to overlap the RF circuit 210. The signal terminal 211 is connected to a signal pattern SP2 positioned in the conductor layer L2, and the ground terminal 212 is connected to a ground pattern GP2 positioned in the conductor layer L2. The clock circuit 220 is a circuit black that generates an internal clock based on a clock signal supplied from the oscillation circuit component 300, and a clock terminal 221 that is supplied with the clock signal and a ground terminal 222 that supplies a ground potential to the clock circuit 220 are disposed so as to overlap the clock circuit 220. The clock terminal 221 is connected to a signal pattern SP1 positioned in the conductor layer L2, and the ground terminal 222 is connected to a ground pattern GP1 positioned in the conductor layer L2. The digital circuit 230 is a circuit block that performs various kinds of computations, and a ground terminal 232 that supplies a ground potential to the digital circuit 230 is disposed so as to overlap the digital circuit 230. The ground terminal 232 is connected to the ground pattern GP2 positioned in the conductor layer L2.

The oscillation circuit component 300 is, for example, a crystal oscillator or a temperature compensated crystal oscillator (TCXO) and includes a clock terminal C1 that outputs a clock signal and a ground terminal G1 that is supplied with a ground potential.

The ground terminal G1 of the oscillation circuit component 300 is connected to the ground pattern GP1 positioned in the conductor layer L2 through a ground pattern 141 and a via conductor 171 which are positioned in the conductor layer L4 and a ground pattern GP5 and a via conductor 161 which are positioned in the conductor layer L3. The clock terminal C1 of the oscillation circuit component 300 is connected to the signal pattern SP1 positioned in the conductor layer L2 through a signal pattern 142 and a via conductor 172 which are positioned in the conductor layer L4 and a signal pattern 132 and a via conductor 165 which are positioned in the conductor layer L3. The conductor layer L2 is a conductor layer closest to a plurality of pad electrodes provided to the RFIC 200 and is provided with another ground pattern GP2 in addition to the ground pattern GP1.

The conductor layer L1 is the outermost conductor layer positioned on the other surface 102 side of the multilayer substrate 100 and constitutes an external terminal of the wireless module 10 according to the present embodiment. Thus, the wireless module 10 according to the present embodiment is mounted on a motherboard or the like, the motherboard and the other surface 102 of the multilayer substrate 100 are made to face each other. The conductor layer L1 includes a ground pattern GP0 used as a ground terminal. The ground pattern GP0 is connected to the ground pattern GP1 through a via conductor 151 and to the ground pattern GP2 through a via conductor 152.

The RFIC 200 is embedded in the insulating layer 112 such that the plurality of pad electrodes provided thereto face the conductor layer L2 side and that the back surface thereof faces the conductor layer L3 side. The plurality of pad electrodes provided to the RFIC 200 include a clock terminal C2 and ground terminals G2 and G3. The clock terminal C2 is connected to the signal pattern SP1 through a via conductor 164, whereby the clock signal output from the oscillation circuit component 300 is input to the RFIC 200 through the clock terminal C2. The clock signal is supplied to the clock circuit 220 included in the RFIC 200. The ground terminals G2 and G3 are connected respectively to the ground patterns GP1 and GP2 through respective via conductors 162 and 163. The ground potential supplied to the ground terminal G2 is supplied to the clock circuit 220, and the ground potential supplied to the ground terminal G3 is supplied to the RF circuit 210.

As illustrated in FIG. 2, the ground patterns GP1 and GP2 are separated from each other within the surface of the conductor layer L2. In particular, the ground patterns GP1 and GP2 form a gap 120 between the ground terminals 212 and 222 in a plan view as viewed in the stacking direction. The ground patterns GP1 and GP2 are thus separated from each other through the gap 120 without being short-circuited within the surface of the conductor layer L2, thus preventing harmonic noise caused by the oscillation circuit component 300 from directly flowing in the ground pattern GP2, which makes the RF circuit 210 connected to the ground pattern GP2 unlikely to be affected by the harmonic noise. This prevents degradation in communication sensitivity due to the harmonic noise.

The ground patterns GP1 and GP2 are connected in common to the ground pattern GP0 provided in the conductor layer L1; however, in actual use, the wireless module 10 is mounted on a motherboard or the like having a more stable ground potential, so that the harmonic noise flowing from the ground pattern GP1 to the ground pattern GP0 is absorbed by the motherboard or the like. This suppresses the harmonic noise that flows around to the RF circuit 210 through the ground pattern GP0.

As described above, in the wireless module 10 according to the present embodiment, the ground pattern GP1 connected to the clock circuit 220 and the ground pattern GP2 connected to the RF circuit 210 are separated in the conductor layer L2, making the RF circuit 210 unlikely to be affected by the harmonic noise. This makes it possible to prevent degradation in communication sensitivity due to the harmonic noise.

Figure 3:
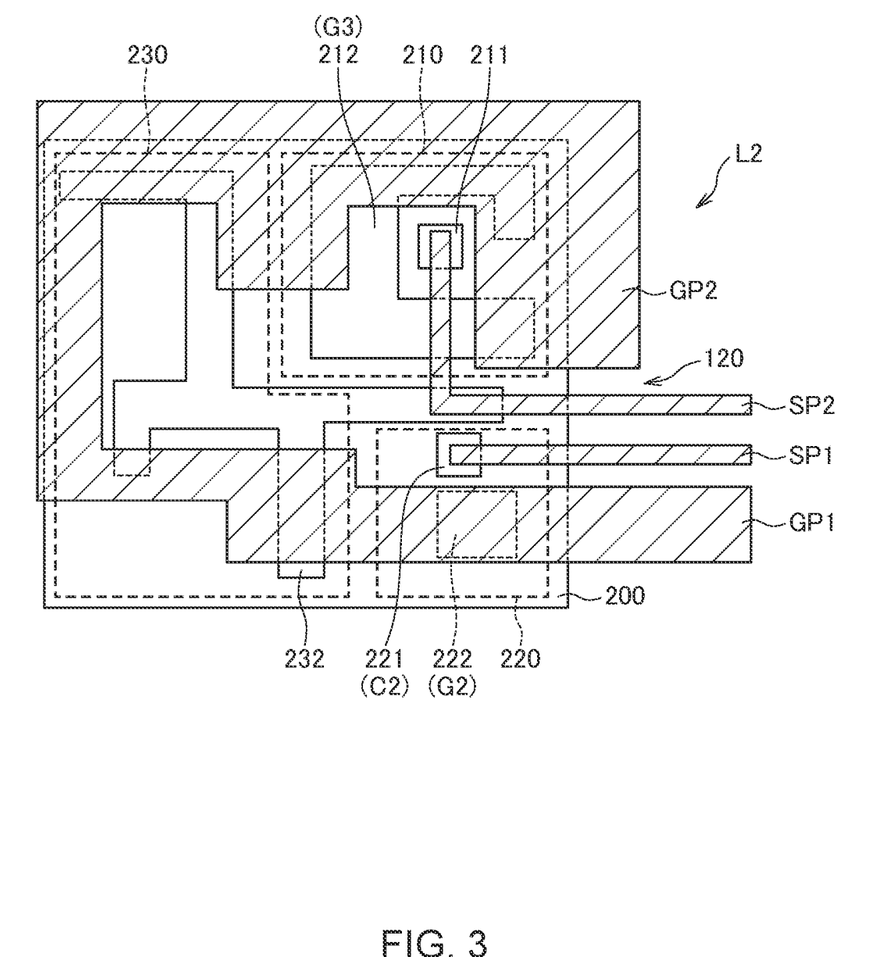
FIG. 3 is a schematic plan view of the RFIC 200 according to a modification.

However, the ground patterns GP1 and GP2 need not completely be separated in the conductor layer L2 but may be connected to each other as in a modification illustrated in FIG. 3. Even in this case, the gap 120 may be formed between the ground terminals 212 and 222 in a plan view as viewed in the stacking direction so as to detour the ground patterns GP1 and GP2 therebetween. This increases the wiring distance of the ground patterns GP1 and GP2 between the ground terminals 212 (G3) and 222 (G2), thus making it possible to reduce influence exerted by the harmonic noise as compared with when the gap 120 is not formed.

Figure 4:
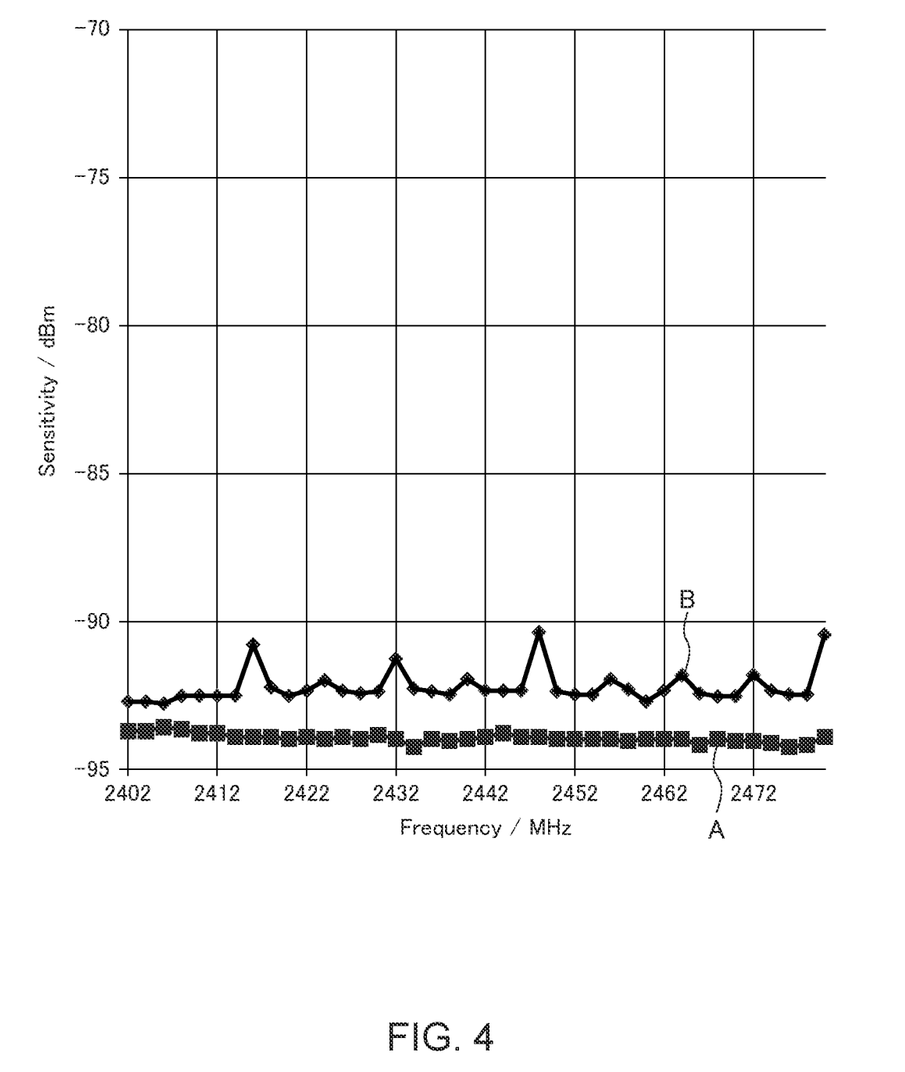
FIG. 4 is a graph illustrating the effect of the wireless module 10 according to the present embodiment.

FIG. 4 is a graph illustrating the effect of the wireless module 10 according to the present embodiment. In FIG. 4, sign A denotes the reception sensitivity of the wireless module 10 according to the present embodiment, and sign B denotes the reception sensitivity of a wireless module of a comparative example. The oscillation frequency of the oscillation circuit component 300 is 16 MHz in both the wireless modules.

The wireless module of the comparative example is a WLCSP type RFIC 200 and is mounted on the surface of the multilayer substrate 100 together with the oscillation circuit component 300 unlike the wireless module 10 according to the present embodiment. As compared with the embedded type RFIC 200 as illustrated in FIG. 1, the WLCSP type RFIC 200 requires a larger area for the pad electrode and is thus low in layout freedom to make it difficult to separate the ground pattern. Therefore, in the wireless module of the comparative example, the ground terminal G1 of the oscillation circuit component 300 is connected in common to the ground terminals G2 and G3 of the RFIC 200 without being separated.

As illustrated in FIG. 4, in the wireless module of the comparative example (sign B), reception sensitivity degrades for each multiplication of 16 MHz which is the oscillation frequency of the oscillation circuit component 300 because the clock signal supplied from the oscillation circuit component 300 goes around to the RFIC 200 via the ground pattern of the entire system including the wireless module 10. On the other hand, in the wireless module 10 according to the present embodiment (sign A), flat and satisfactory reception sensitivity can be obtained.

Figure 5:
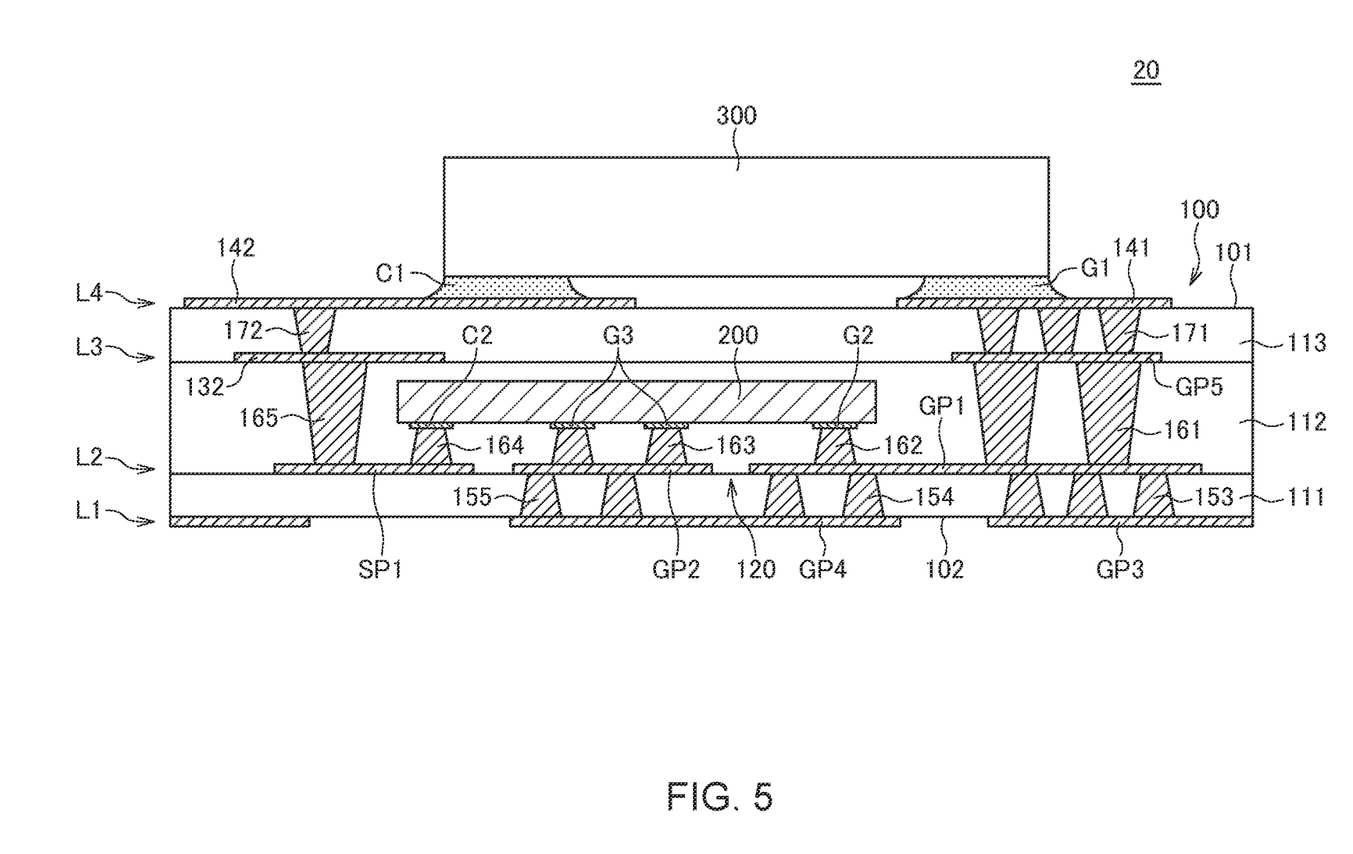
FIG. 5 is a schematic cross-sectional view for explaining the structure of a wireless module 20 according to a second embodiment of the present disclosure.

FIG. 5 is a schematic cross-sectional view for explaining the structure of a wireless module 20 according to a second embodiment of the technology described herein.

As illustrated in FIG. 5, the wireless module 20 according to the second embodiment differs from the wireless module 10 according to the first embodiment in that the ground pattern GP0 positioned in the conductor layer L1 is divided into ground patterns GP3 and GP4. Other basic configurations are the same as those of the wireless module 10 according to the first embodiment, so the same reference numerals are given to the same elements, and overlapping description will be omitted.

The ground pattern GP3 is connected to the ground pattern GP1 through a via conductor 153. The ground pattern GP4 is connected to the ground pattern GP1 through a via conductor 154 and to the ground pattern GP2 through a via conductor 155. The ground patterns GP3 and GP4 are separated from each other within the surface of the conductor layer L1. This makes it harder for the harmonic noise to flow around from the oscillation circuit component 300 to the RFIC 200, making it possible to more effectively suppress degradation in communication sensitivity.

Figure 6:
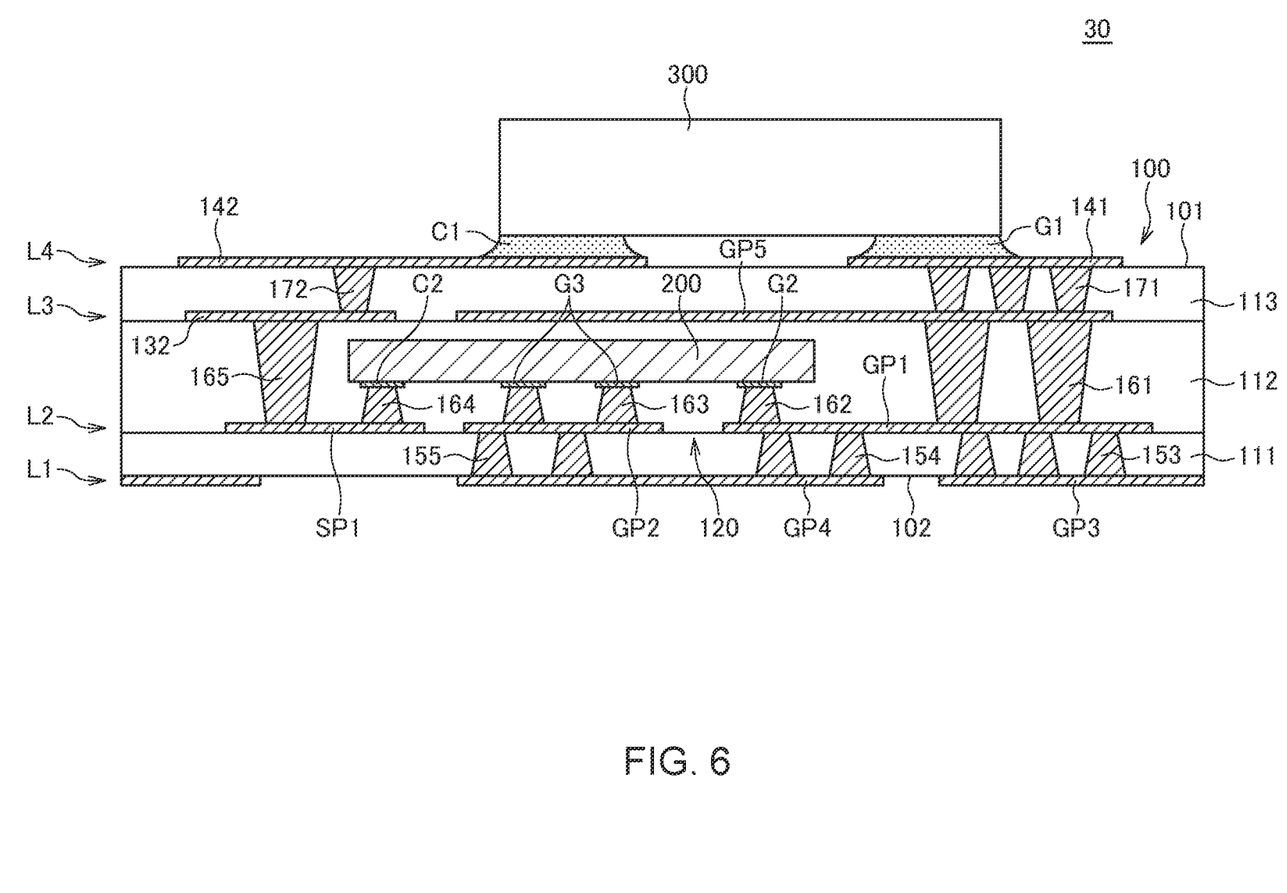
FIG. 6 is a schematic cross-sectional view for explaining the structure of a wireless module 30 according to a third embodiment of the present disclosure.

FIG. 6 is a schematic cross-sectional view for explaining the structure of a wireless module 30 according to a third embodiment of the technology described herein.

As illustrated in FIG. 6, the wireless module 30 according to the third embodiment differs from the wireless module 20 according to the second embodiment in that the ground pattern GP5 positioned in the conductor layer L3 is enlarged to overlap both the oscillation circuit component 300 and RFIC 200 in a plan view as viewed in the stacking direction. Other basic configurations are the same as those of the wireless module 20 according to the second embodiment, so the same reference numerals are given to the same elements, and overlapping description will be omitted.

Although the ground pattern GP5 may completely overlap the oscillation circuit component 300 and RFIC 200, it may be absent at a position where the oscillation circuit component 300 and RFIC 200 do not overlap each other. When the ground pattern GP5 is thus enlarged, the oscillation circuit component 300 and RFIC 200 are spatially shielded from each other, thus making it possible to further reduce the influence that the harmonic noise has on the RFIC 200.

Figure 7:
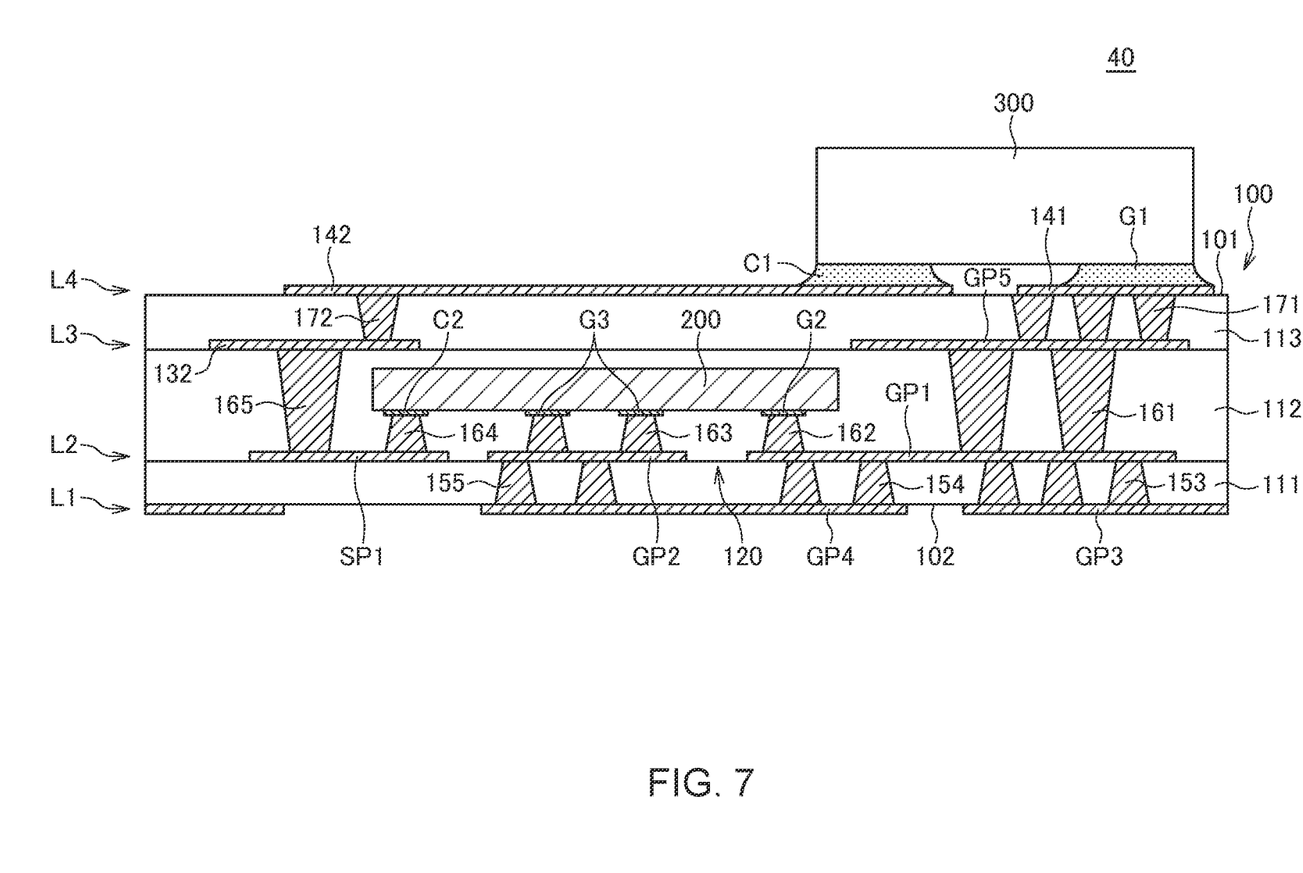
FIG. 7 is a schematic cross-sectional view for explaining the structure of a wireless module 40 according to a fourth embodiment of the present disclosure.

FIG. 7 is a schematic cross-sectional view for explaining the structure of a wireless module 40 according to a fourth embodiment of the technology described herein.

As illustrated in FIG. 7, the wireless module 40 according to the fourth embodiment differs from the wireless module 20 according to the second embodiment in that, in a plan view as viewed in the stacking direction, the oscillation circuit component 300 and RFIC 200 do not overlap each other, and the RFIC 200 and ground pattern GP5 do not overlap each other. Other basic configurations are the same as those of the wireless module 20 according to the second embodiment, so the same reference numerals are given to the same elements, and overlapping description will be omitted.

When the oscillation circuit component 300 is relatively small in size as in the wireless module 40 according to the fourth embodiment, making the oscillation circuit component 300 and RFIC 200 not overlap each other makes it possible to further reduce the influence that the harmonic noise has on the RFIC 200.

Figure 8:
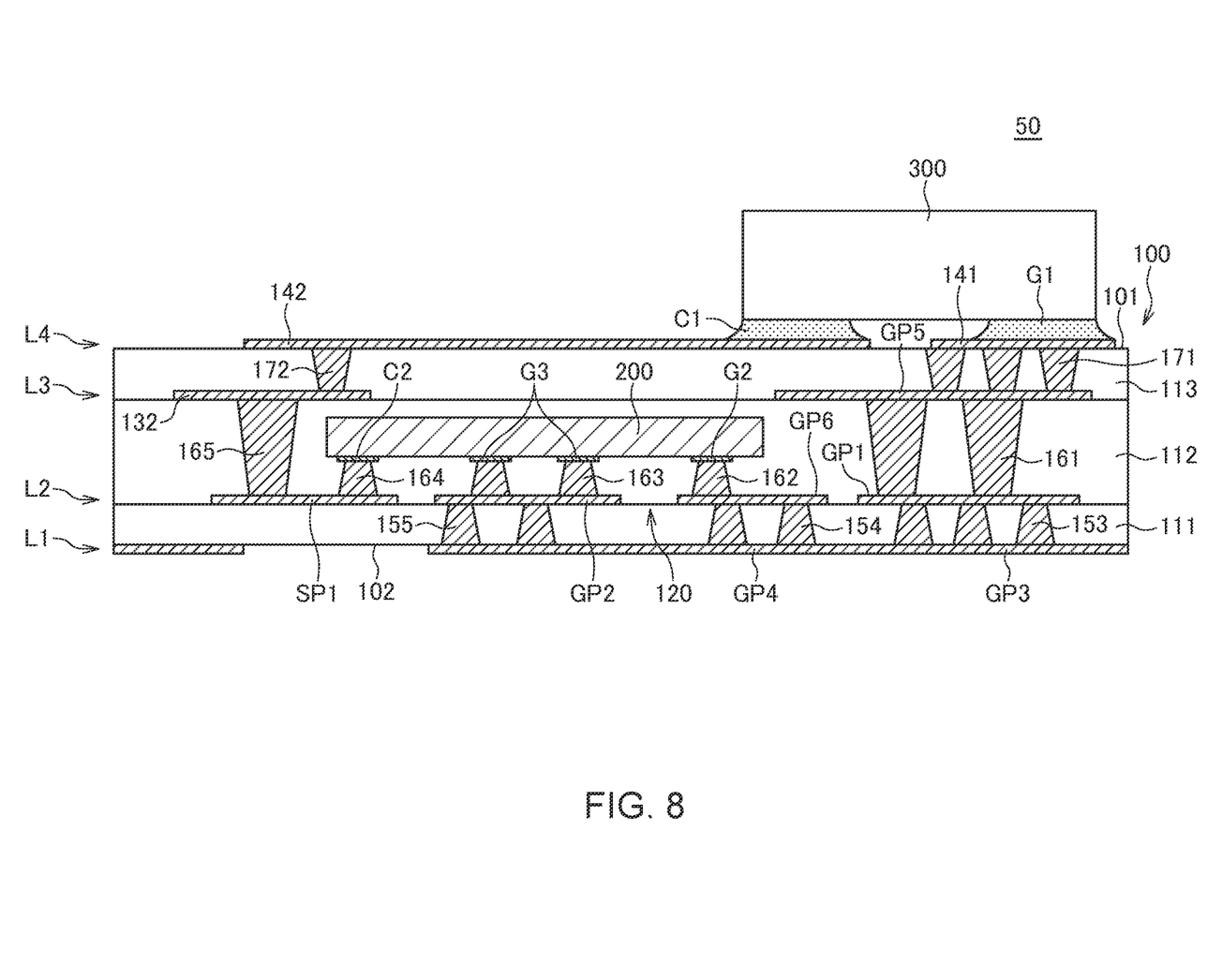
FIG. 8 is a schematic cross-sectional view for explaining the structure of a wireless module 50 according to a fifth embodiment of the present disclosure.

FIG. 8 is a schematic cross-sectional view for explaining the structure of a wireless module 50 according to a fifth embodiment of the technology described herein.

As illustrated in FIG. 8, the wireless module 50 according to the fifth embodiment differs from the wireless module 40 according to the fourth embodiment in that the ground pattern GP1 is divided into two, the ground pattern GP1 connected to the via conductor 161 in the conductor layer L2 and a ground pattern GP6 connected to the via conductor 162 and, instead, the ground patterns GP3 and GP4 are connected to each other in the conductor layer L1. Other basic configurations are the same as those of the wireless module 40 according to the fourth embodiment, so the same reference numerals are given to the same elements, and overlapping description will be omitted.

When the ground pattern GP1 and ground pattern GP6 are separately arranged due to restriction of wiring area in the conductor layer L2 as in the wireless module 50 according to the fifth embodiment, the ground patterns GP3 and GP4 are connected to each other in the conductor layer L1, whereby the ground terminal G1 of the oscillation circuit component 300 and the ground terminal G2 of the RFIC 200 can be made to have the same potential. Even in this case, in actual use, the wireless module 50 is mounted on a motherboard or the like having a more stable ground potential, so that the harmonic noise flowing from the ground pattern GP1 to the ground pattern GP3 is absorbed by the motherboard or the like.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

A wireless module according to one aspect of the present disclosure includes a multilayer substrate, an oscillation circuit component, and an RFIC, the oscillation circuit component and RFIC being mounted on the multilayer substrate. The multilayer substrate includes a first conductor layer positioned closest to a plurality of pad electrodes provided to the RFIC. The oscillation circuit component includes a clock terminal that outputs a clock signal and a first ground terminal that is supplied with a ground potential. The RFIC includes a clock circuit that is supplied with the clock signal and an RF circuit that transmits/receives an RF signal. The plurality of pad electrodes includes a second ground terminal that supplies a ground potential to the clock circuit and a third ground terminal that supplies a ground potential to the RF circuit. The first conductor layer includes a first ground pattern that is connected to the first and second ground terminals and a second ground pattern that is connected to the third ground terminal. The first and second ground patterns form a gap between the second and third ground terminals in a plan view as viewed in a stacking direction of the multilayer substrate. This makes it hard for harmonic noise caused by the oscillation circuit component to flow around to the RF circuit, suppressing degradation in communication sensitivity due to the harmonic noise.

In the above wireless module, the first and second ground patterns may be separated from each other in the first conductor layer. This makes it harder for harmonic noise caused by the oscillation circuit component to flow around to the RF circuit, more effectively suppressing degradation in communication sensitivity due to the harmonic noise.

In the above wireless module, the oscillation circuit component may be mounted on one surface of the multilayer substrate, and the RFIC may be embedded in the multilayer substrate. This reduces an arrangement pitch of the pad electrodes provided to the RFIC, enhancing the degree of layout freedom of the ground pattern.

In the above wireless module, the multilayer substrate may further include a second conductor layer positioned on the other surface side thereof, the second conductor layer may include a third ground pattern connected to the first ground pattern and a fourth ground pattern connected to the second ground pattern, and the third and fourth ground patterns may be separated from each other in the second conductor layer. This more effectively suppresses degradation in communication sensitivity due to harmonic noise.

In the above wireless module, the multilayer substrate may further include a second conductor layer positioned on the other surface side thereof, the second conductor layer may include a third ground pattern connected to the first ground pattern and a fourth ground pattern connected to the second ground pattern, the third and fourth ground patterns may be connected to each other in the second conductor layer, and the first ground pattern may be divided in the first conductor layer into a part connected to the first ground terminal and a part connected to the second ground terminal. With this configuration, even when the first ground pattern is divided due to restriction of wiring area in the first conductor layer, the first ground terminal of the oscillation circuit component and the second ground terminal of the RFIC can be made to have the same potential.

In the above wireless module, the multilayer substrate may further include a third conductor layer positioned between the one surface thereof and the RFIC, and the third conductor layer may have a fifth ground pattern that overlaps both the oscillation circuit component and RFIC in a plan view as viewed in the stacking direction. With this configuration, the oscillation circuit component and RFIC are spatially shielded from each other, thus further reducing the influence that harmonic noise has on the RFIC.

In the above wireless module, in a plan view as viewed in the stacking direction, the oscillation circuit component and RFIC need not overlap each other, and the RFIC and fifth ground pattern need not overlap each other. This more effectively suppresses degradation in communication sensitivity due to harmonic noise.

What is claimed is:

1. A wireless module comprising:
   a multilayer substrate;
   an oscillation circuit component; and
   an RFIC having a plurality of pad electrodes,
   wherein the oscillation circuit component and RFIC are mounted on the multilayer substrate,
   wherein the multilayer substrate includes a first conductor layer positioned closest to the plurality of pad electrodes of the RFIC,
   wherein the oscillation circuit component includes a clock terminal that outputs a clock signal and a first ground terminal that is supplied with a ground potential,
   wherein the RFIC includes a clock circuit that is supplied with the clock signal and an RF circuit that transmits/receives an RF signal,
   wherein the plurality of pad electrodes of the RFIC includes a second ground terminal that supplies a ground potential to the clock circuit and a third ground terminal that supplies a ground potential to the RF circuit,
   wherein the first conductor layer includes a first ground pattern that is connected to the first and second ground terminals and a second ground pattern that is connected to the third ground terminal, and
   wherein the first and second ground patterns form a gap between the second and third ground terminals in a plan view as viewed in a stacking direction of the multilayer substrate.

2. The wireless module as claimed in claim 1, wherein the first and second ground patterns are separated from each other in the first conductor layer.

3. The wireless module as claimed in claim 1,
   wherein the oscillation circuit component is mounted on one surface of the multilayer substrate, and
   wherein the RFIC is embedded in the multilayer substrate.

4. The wireless module as claimed in claim 3,
   wherein the multilayer substrate further includes a second conductor layer positioned on another surface side of the multilayer substrate,
   wherein the second conductor layer includes a third ground pattern connected to the first ground pattern and a fourth ground pattern connected to the second ground pattern, and
   wherein the third and fourth ground patterns are separated from each other in the second conductor layer.

5. The wireless module as claimed in claim 3,
   wherein the multilayer substrate further includes a second conductor layer positioned on another surface side of the multilayer substrate,
   wherein the second conductor layer includes a third ground pattern connected to the first ground pattern and a fourth ground pattern connected to the second ground pattern,
   wherein the third and fourth ground patterns are connected to each other in the second conductor layer, and
   wherein the first ground pattern is divided in the first conductor layer into a part connected to the first ground terminal and a part connected to the second ground terminal.

6. The wireless module as claimed in claim 3,
   wherein the multilayer substrate further includes a third conductor layer positioned between the one surface thereof and the RFIC, and
   wherein the third conductor layer has a fifth ground pattern that overlaps both the oscillation circuit component and RFIC in a plan view as viewed in the stacking direction.

7. The wireless module as claimed in claim 3, wherein, in a plan view as viewed in the stacking direction, the oscillation circuit component and RFIC do not overlap each other, and the RFIC and fifth ground pattern do not overlap each other.

* * * * *